US009851458B2

(12) United States Patent
Workman

(10) Patent No.: US 9,851,458 B2
(45) Date of Patent: Dec. 26, 2017

(54) BODY WEARABLE RADIATION DETECTOR HAVING A RIBBED SCINTILLATOR

(71) Applicant: PartTec Ltd., Avon, IN (US)

(72) Inventor: Herschel E Workman, Avon, IN (US)

(73) Assignee: PartTec LTD, Greencastle, IN (US)

( * ) Notice: Subject to any disclaimer, the term of this patent is extended or adjusted under 35 U.S.C. 154(b) by 0 days.

(21) Appl. No.: 15/332,032

(22) Filed: Oct. 24, 2016

(65) Prior Publication Data

US 2017/0038486 A1 Feb. 9, 2017

Related U.S. Application Data

(63) Continuation-in-part of application No. 12/880,505, filed on Sep. 13, 2010, now Pat. No. 8,796,636, and
(Continued)

(51) Int. Cl.
| | |
|---|---|
| *G01T 3/06* | (2006.01) |
| *G01T 1/02* | (2006.01) |
| *G01T 1/20* | (2006.01) |
| *G01T 1/208* | (2006.01) |
| *G01T 7/12* | (2006.01) |
| *G08B 21/12* | (2006.01) |

(52) U.S. Cl.
CPC ............... *G01T 3/06* (2013.01); *G01T 1/023* (2013.01); *G01T 1/20* (2013.01); *G01T 1/201* (2013.01); *G01T 1/208* (2013.01); *G01T 7/125* (2013.01); *G08B 21/12* (2013.01)

(58) Field of Classification Search
CPC .. G01T 3/06; G01T 1/023; G01T 1/20; G01T 1/201; G01T 1/208; G01T 7/125; G08B 21/12
See application file for complete search history.

(56) References Cited

U.S. PATENT DOCUMENTS

| 6,078,052 A | 6/2000 | DiFilippo |
| 8,592,775 B2 | 11/2013 | Workman et al. |
(Continued)

FOREIGN PATENT DOCUMENTS

| JP | 2010279064 | 12/2010 |
| WO | 2010099334 | 9/2010 |

OTHER PUBLICATIONS

Patent Cooperation Treaty International Search Report; dated Jan. 10, 2012; PCT/US2011/051429.
Patent Cooperation Treaty Written Opinion of the International Searching Authority; dated Jan. 10, 2012; PCT/US/2011/051429.
Patent Cooperation Treaty International Search Report; dated Jan. 9, 2012; PCT/US2011/0514296.
(Continued)

*Primary Examiner* — David Porta
*Assistant Examiner* — Faye Boosalis
(74) *Attorney, Agent, or Firm* — Indiano & McConnell LLC

(57) ABSTRACT

A wearable neutron detector is disclosed that includes a body attachment portion that is configured to be secured to a portion of a human body. The wearable detector includes a scintillator having a plurality of wavelength optical shifting fibers. One or more light converters are connected with the wavelength optical shifting fibers. A detection circuit is connected with the light converters configured to detect a neutron event. A control unit is connected with the detection circuit. An annunciator is connected with the control unit for generating an enunciation of the neutron event. The electronic components are housed within the body attachment portion.

20 Claims, 5 Drawing Sheets

Related U.S. Application Data a continuation-in-part of application No. 12/913,715, filed on Oct. 27, 2010, now Pat. No. 8,592,775, and a continuation-in-part of application No. 14/089,352, filed on Nov. 25, 2013, now Pat. No. 9,507,034.

(56) References Cited

U.S. PATENT DOCUMENTS

| | | | |
|---|---|---|---|
| 8,796,636 B2 | 8/2014 | Kline et al. | |
| 9,606,245 B1 * | 3/2017 | Czarnecki | G01T 1/2006 |
| 2002/0121604 A1 * | 9/2002 | Katagiri | G01T 1/1644 |
| | | | 250/368 |
| 2010/0226580 A1 * | 9/2010 | Frank | G06K 9/00543 |
| | | | 382/209 |

OTHER PUBLICATIONS

Patent Cooperation Treaty Written Opinion of the International Searching Authority; dated Jan. 9, 2012; PCT/US/2011/051426.

URL: http://www.rtftechnologies.org/physics/fusor-mark3-neutron-detector.htm; IEC Fusion Reactor Mark 3 Neutron Detector; RTF Technologies; Jan. 21, 2011.

URL: http://www.analytical-online.com/Products/Analytical_instru/ortecneutron.html; Neutron Detection Systems and Instruments; Jan. 21, 2011.

URL: http://www.canberra.com/products/1150.asp; Neutron Detectors—NP Series-Canberra, Analytical instruments, systems and service; Jan. 21, 2011.

URL: http://ortec-online.com/Solutions/homeland-security.aspx; Homeland Security ORTEC Scientific Equipment; Jan. 21, 2011.

* cited by examiner

BODY WEARABLE RADIATION DETECTOR HAVING A RIBBED SCINTILLATOR

RELATED APPLICATIONS

This application is a continuation in part of, and claims the benefit of and priority to, U.S. application Ser. No. 14/089,352, filed on Nov. 25, 2013, entitled RADIATION DETECTOR HAVING A RIBBED SCINTILLATOR, which is a continuation of, and claims the benefit of and priority to, U.S. application Ser. No. 12/913,715, filed on Oct. 27, 2010, entitled RADIATION DETECTOR HAVING A RIBBED SCINTILLATOR and now U.S. Pat. No. 8,592,775. This application is also related to, and claims the benefit of, U.S. application Ser. No. 12/880,505, filed Sep. 13, 2010, entitled NEUTRON DETECTOR HAVING ENHANCED ABSORPTION AND BIFURCATED DETECTION ELEMENTS and now U.S. Pat. No. 8,796,636, which is incorporated herein by reference in its entirety.

BACKGROUND

The technical field generally relates to radiation detection sensors, and more specifically but not exclusively to neutron detectors. Neutron detection depends upon having materials available that provide the ability to detect neutron events. Where neutron detection is required, the use of materials that have a high thermal neutron capture cross-section is highly desirable for neutron detectors. Where the neutron detection distinct from other background radiation types is desired, for example gamma radiation, the use of materials that also have a lower gamma ray interaction cross section is also desirable. Accordingly, a relatively small number of materials are particularly suitable for neutron detection. Enhancements to neutron absorption efficiency in neutron detectors allow the use of otherwise marginal materials, or allow improved performance from presently utilized materials. Therefore, further technological developments are desirable in this area.

Current demand is for more convenient, passive detection systems that do not require special attention or handling by the operator. Examples include radiation badges as wells as dosimeters that are worn in the pocket or belt-worn detectors and dosimeters. While the existing devices are very helpful for many applications, there is currently no wearable neutron detector which gives immediate, real-time annunciation of an increase in the neutron field in which the operator is working.

SUMMARY

One embodiment is a unique body wearable neutron detector having a ribbed scintillator and wavelength shifting fibers positioned between each pair of ribs. Further embodiments, forms, objects, features, advantages, aspects, and benefits shall become apparent from the following description and drawings.

DESCRIPTION OF THE ILLUSTRATIVE EMBODIMENTS

Figure 1:
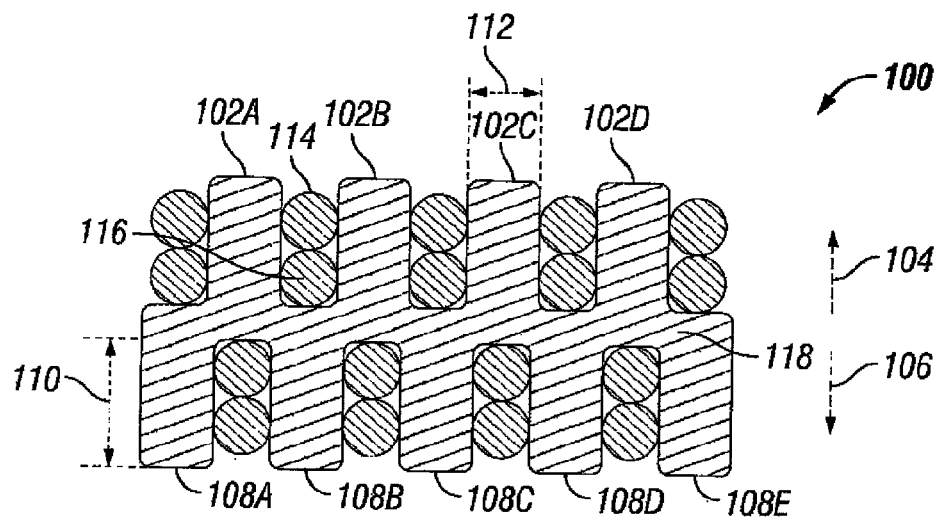
FIG. 1 is an illustration of a radiation scintillator and a number of sets of wavelength shifting fibers.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an apparatus 100 includes a scintillator body 118 having a number of parallel ribs 102a, 102b, 102c, 102d (first ribs 102) on a first side 104. The first ribs 102 are parallel but need not be vertical and may be curvilinear (either vertically or axially); however straight, vertical ribs may be easier to manufacture. Parallel, in the sense used herein, indicates that the ribs 102 do not intersect over the axial length (perpendicular to the view of FIG. 1) of the scintillator body 118, and that a wavelength shifting fiber 114 positioned between the ribs 102a, 102b maintains a similar geometrical distance relative to the ribs 102a, 102b over the axial length of the scintillator body 118. A similar geometrical distance is a distance that, in the absence of interfering features, provides similar optical communication between the ribs 102a, 102b and the wavelength shifting fiber 114 over the axial length of the scintillator body 118. The scintillator body 118 may be a single continuous piece as illustrated, or it may be formed from multiple discontinuous pieces.

Figure 4:
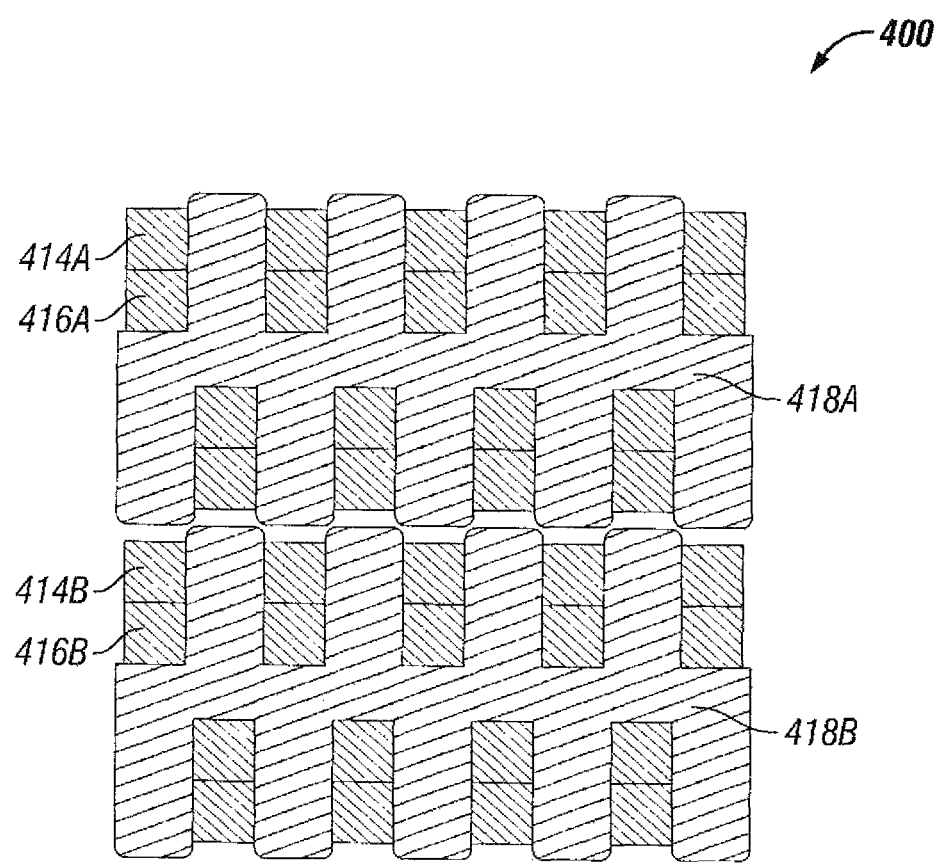
FIG. 4 is a schematic diagram of an alternate radiation scintillator and a number of sets of wavelength shifting fibers.

Referencing FIG. 4, a scintillator body 400 is formed from a first piece 418a stacked with a second piece 418b. The scintillator body 400 is provided with square fibers 414a, 414b, 416a, 416b positioned between the ribs, which improves the packing fraction of the scintillator body 400. It can be seen that, by providing a number of stacked pieces 418a, 418b of the scintillator body 400, the scintillator body 400 can be structured such that an incident radiation particle (or wave) passes through a selectable amount of the scintillator material to provide the desired detection efficiency. In one example, the protrusion height of the first ribs is provided by the combined protrusion height of ribs from the stacked scintillator body portions 418a, 418b.

Returning to FIG. 1, the number of ribs 102 provided is a function of the desired surface area of the scintillator body 118 in the relevant view for detecting radiation—for example in the illustration of FIG. 1, the relevant view is normal to radiation passing through the scintillator body vertically. The thickness 112 of the ribs 102 is selectable, with the limitation that ribs 102 that are too thick will have some re-absorption of cascading photons before they reach the neighboring fibers 114, 116, and ribs 102 that are too thin will result more fibers and related light converters than are necessary to provide the desired surface area of the scintillator body 118, increasing the cost of the apparatus 100. A rib thickness 112 between 0.5 mm to 1.0 mm is typical, but any thickness 112 may be utilized.

Any number of ribs 102, 108 that is three or greater is contemplated herein. In one example, where the scintillator body 118 is 10 cm wide, the rib thickness 112 is 1.0 mm, and the fibers are 0.3 mm O.D., the scintillator body 118 includes about 75 ribs 102. In a second example, a set of fibers (not shown) includes two columns of fibers side-by-side, with a first column of fibers adjacent to one of the two adjacent ribs, and a second column of fibers adjacent to the second of the two adjacent ribs. Where the scintillator body 118 is 10 cm wide, the rib thickness 112 is 1.0 mm, and the fibers are 0.3 mm O.D., the scintillator body 118 in the second example includes about 60 ribs 102. In a third example, where the scintillator body is 25.4 cm wide, the rib thickness 112 is 0.2 mm, and the fibers are 0.2 mm O.D. and positioned in a single column between each rib. The scintillator body 118 in the third example includes about 575 ribs.

In certain embodiments, an exemplary thickness of the first ribs and/or the second ribs is 0.2 mm, 0.22 mm, at least 0.5 mm, or about 1.0 mm. An exemplary protrusion height of the first ribs and/or the second ribs is 0.5 mm, 0.55 mm, or at least 0.6 mm. An exemplary set of the wavelength shifting fibers is at least two wavelength shifting fibers. Exemplary wavelength shifting fiber diameters include 0.2 mm or 0.3 mm. The described dimensions for ribs, scintillator body, and fiber diameters are illustrative and non-limiting.

An exemplary set of embodiments include the apparatus 100 having a neutron scintillator 118 formed with a number of protruding parallel ribs on a first side (first ribs 102) and a second number of protruding parallel ribs on a second side (second ribs 108). The number of protruding parallel ribs includes at least three ribs on each side, but may be any number of ribs according to the size of the neutron scintillator 118. In certain embodiments, the neutron scintillator 118 includes more than six ribs, more than 20 ribs, and/or more than 100 ribs. In certain embodiments, the neutron scintillator 118 includes at least 1 rib on each side per 2.0 mm of width of the neutron scintillator 118, where the ribs are wider than 0.5 mm each. In certain further embodiments, the neutron scintillator 118 includes about 1 rib on each side for each 1.6 mm of width, or about 1 rib for each 1.3 mm of width. Any embodiments including ribs to provide absorption coverage for the neutron scintillator as described herein is contemplated herein.

As is known in the art, the scintillator body 118 includes a radiation absorption material, a scintillating material, and a binder. The radiation absorption material is selected to absorb the desired type of radiation, for example neutron radiation. In certain embodiments, without limitation, the scintillator body 118 includes $^6$Li, $^{10}$B, $^6$LiF:ZnS/Ag, a P47 phosphor, and/or ($^6$LiF:Y$_2$SiO$_5$:Ce).

Positioned between each pair of the first ribs 102, the apparatus 100 includes at least one wavelength shifting fiber. Two adjacent wavelength shifting fibers 114, 116 are illustrated between the ribs 102a, 102b. The number of fibers between particular ribs 102 comprises a set of wavelength shifting fibers. The wavelength shifting fibers are fiber optic cables doped with a material that absorbs photons emitted from the scintillator body 118 and re-emits photons, a percentage of which travel down the fiber to a light converter (not shown). The light converter generates an electrical signal from the light. Exemplary light converters include a photomultiplier diode or a photomultiplier tube. A percentage of radiation incident to the scintillator body 118 is absorbed, and the scintillating material releases a cascade of photons. Some of the photons from the cascade reach a nearby fiber, and the incident radiation is thereby detected.

The apparatus 100 further includes a number of parallel ribs 108a, 108b, 108c, 108d, 108e on a second side (second ribs 108) of the scintillator body 118. The apparatus 100 also include wavelength shifting fiber(s) positioned between the second ribs 108. At the ends of the scintillator body 118, wavelength shifting fibers may optionally be provided on the outer edge of the scintillator body 118. One of skill in the art will understand the tradeoffs of detecting radiation incident to the outer rib of the scintillator body 118, the mechanical integrity of the scintillator body 118, and the exposure to shock or impact of fibers positioned on the outer rib of the scintillator body 118 to determine whether a particular embodiment should include fibers 114,116 on the outer rib or only between the ribs 102, 108.

The apparatus 100 includes the first ribs 102 parallel to the second ribs 108. In certain embodiments, the second ribs 108 may be positioned at a rotated azimuthal angle relative to the first ribs 102. The rotation of the second ribs 108 relative to the first ribs 102 may provide benefits to the mechanical integrity of the scintillator body 118, and/or may provide for easier mechanical construction of a device including the scintillator body 118 by allowing the fibers 114, 116 to exit the second ribs 108 at a selectable angle relative to the first ribs 102. However, areal coverage of radiation absorption to radiation perpendicular to the plane of the scintillator body 118 (i.e. radiation travelling vertically in the illustration of FIG. 1) is increased when the first ribs 102 and second ribs 108 are parallel and offset, as shown. The decision whether to use the second ribs 108, whether to offset the second ribs 108, and to what extent to offset the second ribs 108 from the first ribs 102 have implications for the overall absorption efficiency of the apparatus 100, and the decision is a mechanical step for one of skill in the art having the benefit of the disclosures herein.

Where the scintillator body 118 is described as having a plane herein, the plane of the scintillator body 118 may be only locally planar, where the scintillator body 118 as a whole forms a curved surface. Locally planar, as used herein, indicates that the curvature of the scintillator body 118 in the space of several of the ribs 102, 108 is approximately planar, or has a very high radius of curvature relative to the protrusion height 110 of a rib 102, 108 (e.g. radius of curvature is at least 3×, 5×, 10×, or greater than the protrusion height 110). In certain embodiments, the scintillator body 118 may not be planar, or may be planar only in certain portions of the scintillator body 118.

Figure 3A:
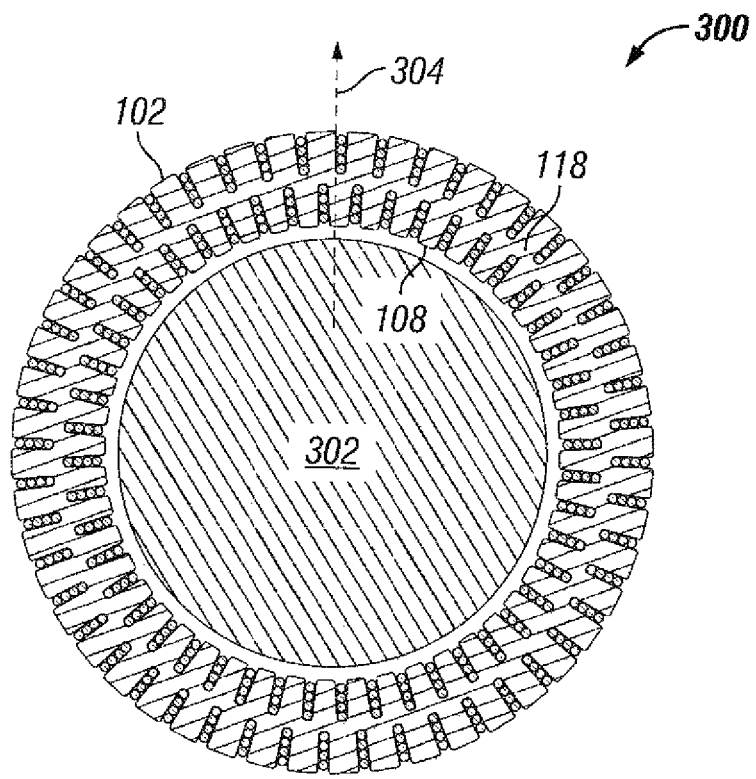
FIG. 3a is an end view of a radiation scintillator positioned around a cylindrical moderator.

For example, referencing FIG. 3a, an end view of an apparatus 300 including a curved scintillator body 118 is illustrated having first ribs 102 on an outer side and second ribs 108 on an inner side. An illustrative radiation particle 304 is shown incident to the scintillator body 118. In the example, the particle 304 is a moderated thermal neutron emitted by the moderator 302 positioned within the scintillator body 118. Because the first ribs 102 and second ribs 108 are parallel and offset, the particle 304 cannot pass through the scintillator body 118 without passing through at least one rib from either the first ribs or the second ribs, even where the particle 304 passes perpendicularly (relative to the local plane at the position of contact) through the scintillator body 118.

Figure 2:
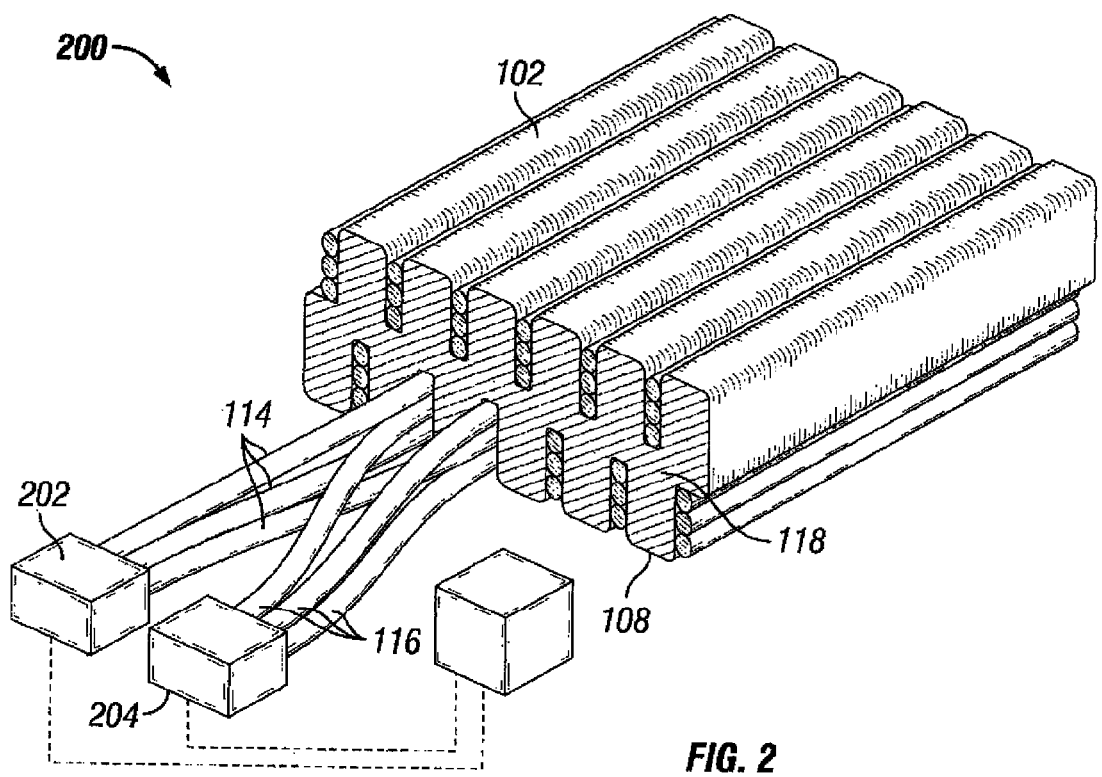
FIG. 2 is a schematic diagram of a system for high efficiency radiation detection.

Referencing FIG. 2, apparatus 200 is shown in a perspective view. The apparatus 200 includes two light converters 202, 204. The fibers are routed to the light converters 202, 204 such that no two adjacent fibers 114, 116 pass to the same light converter 202, 204. For clarity of illustration, just a few fibers are shown being optically coupled to the light converters 202, 204. However, the apparatus 200 includes each fiber routed to a light converter 202, 204, and the number of light converters 202, 204 may be any number, two or more, as described herein. Additionally, each light converter 202, 204 may be optically coupled to any number of fibers as described herein. In one form, the light converters 202, 204 may comprise photo multiplier tubes ("PMTs") and in other forms the light converters 202, 204 may comprise charge coupled devices ("CCDs").

Figure 3B:
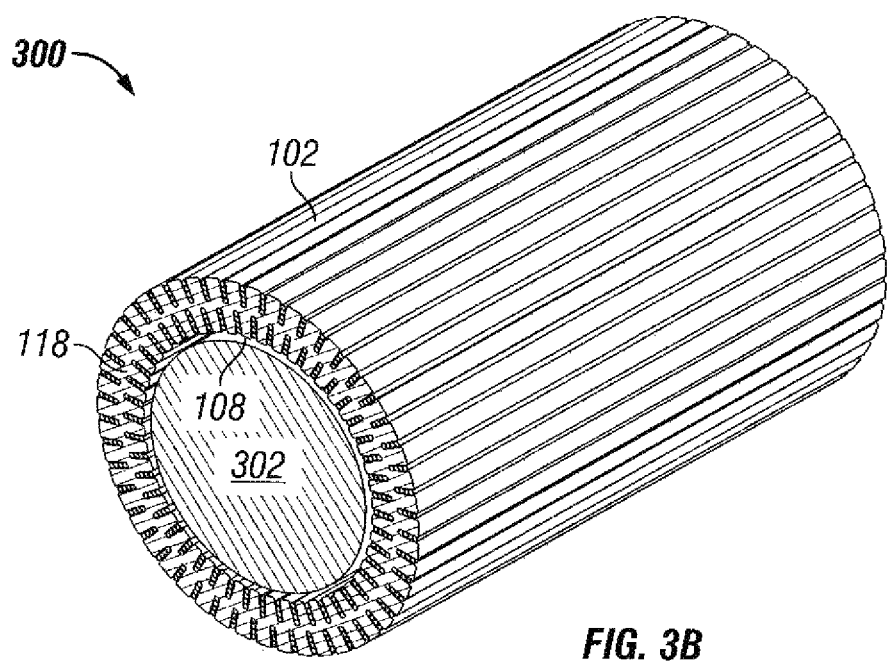
FIG. 3b is a perspective view of the radiation scintillator positioned around the cylindrical moderator.

An apparatus 300 such as that illustrated in FIGS. 3a and 3b may be optionally utilized in a directional radiation detector. In one example, the moderator 302 is a material that interacts with high energy neutrons and re-emits thermal neutrons as understood in the art. The scintillator 118 forms a cylindrical portion, as shown in FIG. 3, and the moderator 302 is positioned within the scintillator 118. The cylindrical form of the scintillator 118 and moderator 302 may be of any cross-section, including circular as illustrated in FIG. 3, and further the cross-section may be varied in shape or size in the axial direction to form whatever desired overall shape for the detector. A shield material (not shown) partially encloses the moderator 302, such that neutrons are substantially blocked from reaching the moderator 302 except from a desired detection direction. Thereby, a neutron detector may be constructed to detect a neutron source and to determine a direction of the neutron source. Exemplary shield materials include, for example, gadolinium, but any shield material understood in the art is sufficient.

The offset of the first ribs 102 and the second ribs 108 may be complete, as shown in FIG. 1, where a radiation particle (or wave) passing perpendicular to the plane of the scintillator body 118 must pass through either one of the first ribs 102 or the second ribs 108. Where the ribs 102, 108 are not vertical, the ribs 102, 108 may nevertheless be parallel in a projected angle (e.g. 30 degrees off of vertical), and offset in the projected angle, such that a radiation particle (or wave) must pass through one of the first ribs 102 or second ribs 108 regardless of the angle of the incident radiation.

The ribs 102, 108 include a protrusion height 110 from the scintillator body 118 base. The selection of the protrusion height 110, combined with the known absorption efficiency of the scintillator body 118, allows for selection of an arbitrarily high absorption efficiency of incident radiation. For example, a mean radiation absorption distance is determined according to the desired absorption efficiency and the required travel distance through the scintillator body 118 material to achieve the desired absorption efficiency. Then, a rib protrusion height 110 is selected that is at least equal to the mean radiation absorption distance. Finally, a number of wavelength shifting fibers are positioned between the ribs to provide optical detection coverage over at least the mean radiation absorption distance. The selection of the number of ribs 102, 108 is provided to cover the desired surface area of the scintillator body 118 normal to the expected radiation source (which may be a moderator in the case of thermal neutron detection).

Referencing FIG. 2, a system 200 is shown having a scintillator body 118, first ribs 102 on a first side, and second ribs 108 on a second side. The system 200 includes three wavelength shifting fibers between each pair of the ribs 102, 108, although any number of wavelength shifting fibers may be present as described in the section referencing FIG. 1. The system 200 further includes the fibers 114, 116 passing to light converters 202, 204. Adjacent fibers pass to different light converters 202, 204 in the example. For example, with three fibers, a high and low fiber pass to a first converter 202 and the middle fiber passes to the second converter 204. The converters 202, 204 may accept any number of fibers from between the various ribs 102, 108. However, for reasons described as follows, the number of fibers passing to each converter 202, 204 may be limited to enhance the detection capability of the system 200.

The system 200 includes a controller 206 that functionally executes certain operations for detecting radiation. In certain embodiments, the controller 206 forms a portion of a processing subsystem including one or more computing devices having memory, processing, and communication hardware. The controller may be a single device or a distributed device, and the functions of the controller may be performed by hardware or software. The controller 206 interprets two distinct electrical signals, one provided by each of two adjacent wavelength shifting fibers. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

For example, a fiber 114 is optically coupled to a first light converter 202 that provides a first electrical signal, and a fiber 116 is optically coupled to a second light converter 204. The first light converter 202 and second light converter 204 provide distinct electrical signals to the controller 206. The signals are from each of two adjacent wavelength shifting fibers positioned between one of the adjacent pairs of the ribs 102. In the example of FIG. 2, the light converters 202, 204 are optically coupled to fibers from a number of the rib 102 grooves, although in certain embodiments the light converters 202, 204 may be optically coupled to fibers from only one of the rib 102 grooves, and/or only from a single fiber.

The number of light converters 202, 204 utilized is a design choice. A low ratio of fibers per light converter provides costs and benefits. Increasing the number of light converters increase the cost of the system 200. Light converters may be photo-multiplier tubes, which are highly capable but very expensive. Where the light converters are solid state photo sensors, the costs are greatly reduced, rendering a lower fiber to light converter ratio more economical. A large number of light converters also increases the processing burden of the controller 206, and thus increases the cost of hardware and software for the controller 206 and the communications between the controller 206 and the light converters.

Decreasing the number of light converters, with the same number of fibers, increases the number of events that each light converter is experiencing. Where the controller 206 distinguishes that a neutron radiation event has occurred, rather than a gamma radiation event, in response to simultaneous signals from two adjacent fibers, there is a greater chance that two independent events will occur within a short enough time span to complicate or even prevent proper detection of neutron events if the number of fibers optically coupled to each light converter is high. For example, background gamma radiation causes photons to hit individual fibers. Where a single light converter services too many fibers, the light converter will see an amplitude excursion for a high percentage of the time that is not related to neutron events, preventing the detection of neutron events and/or causing a significant number of simultaneous amplitude excursions in other light converters potentially causing false neutron detections. Certain operations and apparatus to distinguish a neutron radiation event from a gamma radiation event using simultaneous signals from two adjacent fibers in the presence of a neutron scintillator are described in U.S. patent application Ser. No. 12/888,505 entitled "Neutron detector having enhanced absorption and bifurcated detection elements" filed on Sep. 13, 2010, and which is incorporated herein by reference in the entirety.

In certain embodiments, the ratio of fibers to light converters is between 1:1 and 9:1, inclusive. The higher limit of the ratio of fibers is limited by the background radiation flux, the size of the fiber end face, and the size of the light converter receiving face. In certain embodiments, the ratio of fibers to light converters is between 2:1 and 40:1, or between 10:1 and 40:1. In certain further embodiments, the ratio of fibers to light converters is between 10:1 and 100:1. The higher values of fiber ratios may be useful in a very low flux environment where gamma background radiation is infrequent.

The operational descriptions which follow provide an illustrative embodiment of a procedure for high absorption efficiency radiation detection. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure for high efficiency absorption and detection of radiation includes an operation to determine a neutron absorption efficiency per linear distance through a selected neutron scintillator material, and an operation to determine a desired neutron absorption efficiency for the neutron detector. The procedure further includes an operation to determine a neutron mean absorption distance in response to the neutron absorption efficiency and the desired neutron absorption efficiency, and an operation to provide a neutron scintillator having protruding ribs on each side, with first ribs on a first side and second ribs on a second side. The neutron mean absorption distance is the required linear distance for a neutron to pass through the selected neutron scintillator material before an average neutron will have a likelihood of absorption equal to the neutron absorption efficiency. For example, where the neutron absorption efficiency per linear distance is 30% of neutrons absorbed with 1.0 mm, and the desired neutron absorption efficiency is 60%, the neutron mean absorption distance is about 2.6 mm—which can be approximated by solving equation 1.

$$\eta_d = 1 - \left((1-\eta_{ld})^{\frac{nmad}{ld}}\right). \quad 1$$

In equation 1, $\eta_d$ is the desired neutron absorption efficiency, $\eta_{ld}$ is the neutron absorption efficiency per linear distance ld, and nmad is the neutron mean absorption distance. The neutron mean absorption distance may also readily be determined empirically, and in one example the term ld, or the standardized distance at which the absorption efficiency is known, may be equal to the neutron mean absorption distance. Where equation 1 is utilized, any converging or iterative solution for nmad known in the art may be utilized. The distance and efficiency values described are exemplary, and are readily determined for a specific material by one of skill in the art having the benefit of the disclosures herein. The procedure includes an operation to provide the protruding ribs with a protrusion height of at least the neutron mean absorption distance. The protrusion height of the ribs may be a combined protrusion height of ribs from stacked layers of scintillator body portions, for example as illustrated in FIG. 4.

The exemplary procedure further includes an operation to provide the neutron scintillator with the selected neutron scintillator material, and an operation to provide the neutron scintillator to be at least locally planar, with the first ribs offset from the second ribs such that a particle passing through the neutron scintillator perpendicular to the neutron scintillator plane must pass through at least one rib from the first ribs and the second ribs. The procedure further includes providing a set of wavelength shifting fibers positioned between each adjacent pair of the first ribs and each adjacent pair of the second ribs. Each set of wavelength shifting fibers is in optical proximity to the adjacent pair of the ribs that the set of wavelength shifting fiber is positioned between. Each set of wavelength shifting fibers further includes a sufficient number of fibers to optically cover the adjacent pair of the ribs to a height of at least the neutron mean absorption distance. For example, where the neutron mean absorption distance is 0.6 mm, and the fibers have an O.D. of 0.2 mm, then a set of three fibers in a column are provided between each pair of ribs in the set of ribs.

Further detailed embodiments of the procedure are described following. An exemplary procedure further includes an operation to provide the neutron scintillator formed from $^6$Li, $^{10}$B, $^6$LiF:ZnS/Ag, a P47 phosphor, and/or ($^6$LiF:Y$_2$SiO$_5$:Ce). Exemplary values of the desired neutron absorption efficiency include at least 30% absorption of incident neutrons, at least 50% absorption of incident neutrons, at least 80% absorption of incident neutrons, and about 83% absorption of incident neutrons.

In certain further embodiments, the procedure includes an operation to determine a number of electrical signals in response to light emissions from the set of wavelength shifting fibers positioned between each adjacent pair of the first ribs and each adjacent pair of the second ribs. The procedure further includes an operation to determine the number of electrical signals by determining distinct electrical signals from any two adjacent wavelength shifting fibers, and distinguishing a neutron radiation event from a gamma radiation event in response to two adjacent wavelength shifting fibers providing simultaneous electrical signals.

As is evident from the figures and text presented above, a variety of embodiments according to the present invention are contemplated.

An exemplary set of embodiments include a system having a neutron scintillator formed with a multiplicity of protruding parallel ribs on a first side (first ribs) and a second multiplicity of protruding parallel ribs on a second side (second ribs). The multiplicity of protruding parallel ribs includes at least three ribs on each side, but may be any number of ribs according to the size of the neutron scintillator. In certain embodiments, the neutron scintillator includes more than six ribs, more than 20 ribs, and/or more than 100 ribs. In certain embodiments, the neutron scintillator includes more than 1 rib on each side per 2.0 mm of width of the neutron scintillator, where the ribs are wider than 0.5 mm each. In certain further embodiments, the neutron scintillator includes about 1 rib on each side for each 1.6 mm of width, or about 1 rib for each 1.3 mm of width. Any embodiments including ribs to provide absorption coverage for the neutron scintillator as described herein is contemplated herein.

The system includes a set of wavelength shifting fibers positioned between each adjacent pair of the first ribs and each adjacent pair of the second ribs. Accordingly, in an exemplary embodiment, each two ribs of the first side include at least two wavelength shifting fibers positioned therebetween, and each two ribs of the second side include at least two wavelength shifting fibers positioned therebetween. The outside ribs of the first ribs and the second ribs may optionally include wavelength shifting fibers at the outside position of the outside ribs. Each wavelength shifting fiber is in optical proximity to the adjacent pair of the ribs that the wavelength shifting fiber is between. In certain embodiments, two sets of wavelength shifting fibers are positioned side-by-side between one or more of the first and second ribs, and the wavelength shifting fibers are each in optical proximity to the closest rib.

In certain embodiments, the first ribs are parallel to the second ribs, and additionally the first ribs may be offset from the second ribs. In a further embodiment, the neutron scintillator is at least locally planar at the position of the first ribs and the second ribs, and the first ribs are offset from the second ribs such that a particle passing through the neutron scintillator perpendicular to the neutron scintillator plane must pass through at least one rib from the first ribs and the second ribs. Locally planar indicates that a span of the neutron scintillator having a small number of the first ribs and the second ribs is planar or includes a small enough radius of curvature, combined with appropriate shaping of the first ribs or second ribs as necessary, such that a perpendicular incident particle or wave to the span of the neutron scintillator must pass through at least one rib from the first ribs and the second ribs.

In certain embodiments, the width and spacing of the first ribs and second ribs is such that a particle may pass through the neutron scintillator perpendicular to the neutron scintillator plane at sonic positions that do not pass through at least one of the first ribs and second ribs. It will be understood that such a design reduces the overall absorption efficiency of the detector, but allows certain advantages such as potentially reduced manufacturing costs, or the insertion of supportive material within the neutron scintillator. In one example, if the ribs are 0.4 mm wide, and are spaced 1.0 mm center-to-center, then each rib will have an average 0.1 mm gap on each side (depending upon the selected offset between the first ribs and the second ribs). It is a mechanical step for one of skill in the art, having the benefit of the disclosures herein, to select rib widths, spacing, and protrusion height such that manufacturing cost, part reliability, and absorption efficiency are tailored to the specific application.

In certain further embodiments, the neutron scintillator is made from a material including $^6$Li, $^6$LiF:ZnS/Ag, a P47 phosphor, and/or ($^6$LiF:Y$_2$SiO$_5$:Ce). An exemplary thickness of the first ribs and/or the second ribs is at least 0.5 mm. An exemplary protrusion height of the first ribs and/or the second ribs is at least 0.6 mm. An exemplary set of the wavelength shifting fibers is at least two wavelength shifting fibers.

Another exemplary set of embodiments includes an apparatus for high efficiency radiation absorption and detection. The apparatus includes a scintillator body having a radiation absorptive material, a scintillating material, and a binder. The scintillator body is formed with a multiplicity of protruding parallel ribs on a first side, and at least one wavelength shifting fiber positioned between each adjacent pair of ribs. Each wavelength shifting fiber is in optical proximity to the adjacent pair of the ribs that the wavelength shifting fiber is positioned between. An exemplary apparatus includes the radiation absorptive material being a neutron absorptive material.

In certain embodiments, a number of the wavelength shifting fibers are positioned between each adjacent pair of the protruding parallel ribs. In a further embodiment, the apparatus includes a controller structured to functionally execute certain operations for radiation detection. The controller interprets two distinct electrical signals, one signal from each of two adjacent wavelength shifting fibers positioned between one of the adjacent pairs of the protruding parallel ribs, and the controller distinguishes a neutron radiation event from a gamma radiation event in response to detecting a simultaneous response from each of the two distinct electrical signals.

In certain embodiments, the apparatus further includes the scintillator body formed with a second multiplicity of protruding parallel ribs formed on a second side, and with a wavelength shifting fiber positioned between each adjacent pair of the second multiplicity of ribs. Each of the wavelength shifting fibers on the second side is in optical proximity to the adjacent pair of the second multiplicity of the ribs that the wavelength shifting fiber is positioned between. In certain embodiments, the second multiplicity of ribs are parallel to the multiplicity of ribs formed on the first side of the scintillator body, and the second multiplicity of ribs are further offset from the multiplicity of ribs on the first side. A further embodiment includes the scintillator body being at least locally planar, where the second multiplicity of ribs are offset from the multiplicity of ribs on the first side such that a particle passing through the scintillator body perpendicular to the scintillator body plane must pass through at least one rib, either a rib from the first side or a rib from the second side. The multiplicity of ribs in a single layer may be stacked for an arbitrary number of layers, either parallel or alternately offset to increase the amount of scintillator material intercepted by the neutrons, thereby increasing the probability of an interaction.

A further exemplary embodiment includes a number of the wavelength shifting fibers positioned between each adjacent pair of the protruding parallel ribs. The apparatus further includes a controller that interprets two distinct electrical signals from two adjacent wavelength shifting fibers positioned between one of the adjacent pairs of the protruding parallel ribs, and the controller distinguishes a neutron radiation event from a gamma radiation event in response to detecting a simultaneous response from the two distinct electrical signals.

Yet another exemplary set of embodiments includes a method for high efficiency absorption and detection of radiation. The method includes determining a neutron absorption efficiency per linear distance through a selected neutron scintillator material, and determining a desired neutron absorption efficiency for the neutron detector. The method further includes determining a neutron mean absorption distance in response to the neutron absorption efficiency and the desired neutron absorption efficiency, and providing a neutron scintillator having protruding ribs on each side, first ribs on a first side and second ribs on a second side, where the protruding ribs have a protrusion height of at least the neutron mean absorption distance. The method further includes providing the neutron scintillator with the selected neutron scintillator material, and providing the neutron scintillator to be at least locally planar and with the first ribs offset from the second ribs such that a particle passing through the neutron scintillator perpendicular to the neutron scintillator plane must pass through at least one rib from the first ribs and the second ribs. The method further includes providing a set of wavelength shifting fibers positioned between each adjacent pair of the first ribs and each adjacent pair of the second ribs, where each set of wavelength shifting fibers is in optical proximity to the adjacent pair of the ribs that set of the wavelength shifting fiber is positioned between, and where each set of wavelength shifting fibers includes a sufficient number of fibers to optically cover the adjacent pair of the ribs to a height of at least the neutron mean absorption distance.

Further detailed embodiments of the method are described following. An exemplary method includes providing the neutron scintillator formed from $^6$Li, $^{10}$B, $^6$LiF:ZnS/Ag, a P47 phosphor, and/or ($^6$LiF:Y$_2$SiO$_5$:Ce). Exemplary values of the desired neutron absorption efficiency is at least 30% absorption of incident neutrons, at least 50% absorption of incident neutrons, at least 80% absorption of incident neutrons, and/or about 83% absorption of incident neutrons. In certain further embodiments, the method includes determining a number of electrical signals in response to light emissions from the set of wavelength shifting fibers positioned between each adjacent pair of the first ribs and each adjacent pair of the second ribs. The method further includes determining the number of electrical signals by determining distinct electrical signals from any two adjacent wavelength shifting fibers, and distinguishing a neutron radiation event from a gamma radiation event in response to two adjacent wavelength shifting fibers providing simultaneous electrical signals.

Figure 5:
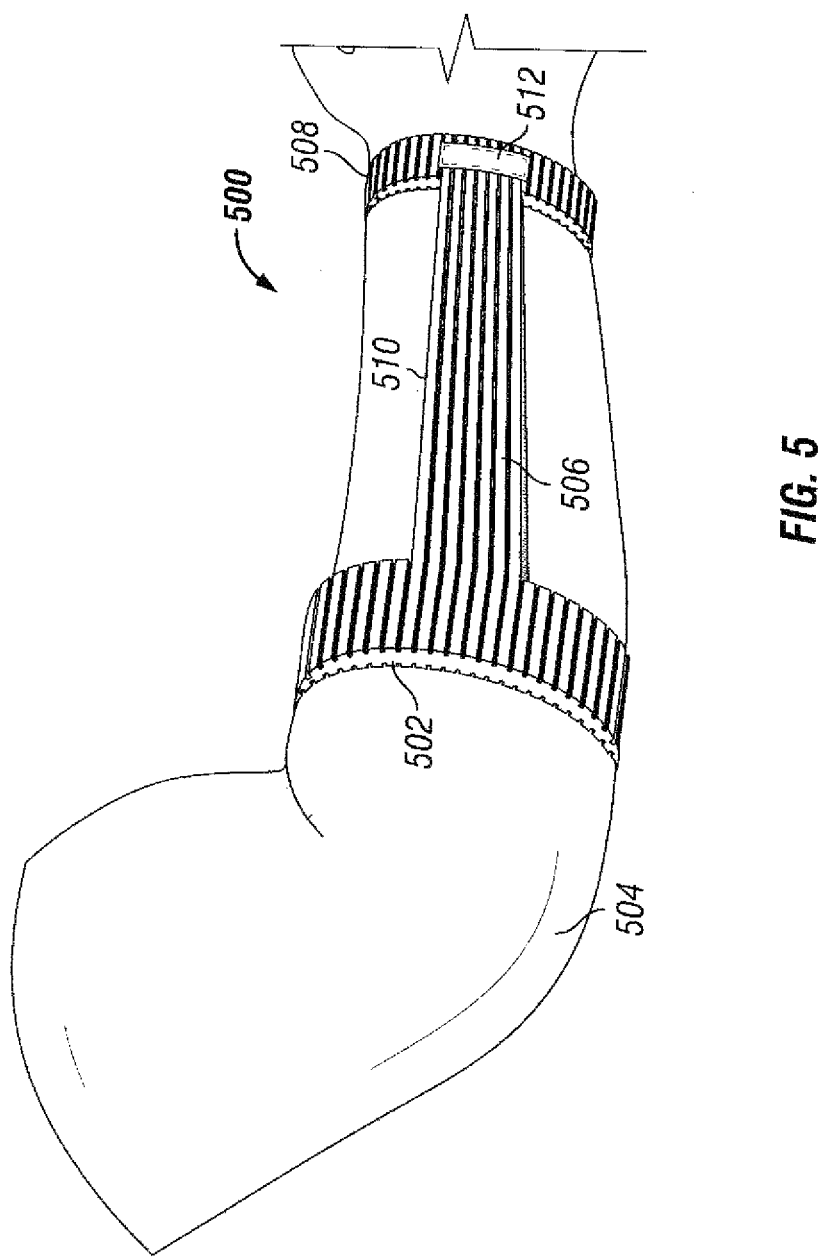
FIG. 5 illustrates a body wearable neutron detector.

Referring to FIG. 5, a wearable neutron detector 500 is illustrated that may incorporate any of the apparatuses and systems 100, 200, 300, and 400 disclosed herein. The wearable neutron detector 500 includes a body attachment portion 502 that allows the neutron detector 500 to be attached to a human body 504. In the illustrated form, the wearable neutron detector 500 is attached to an arm, but in other forms, the wearable neutron detector 500 could be attached to the human body 504 at various locations such as on the waist by a belt, a leg, or in a backpack. As used herein, the term body attachment portion 502 should be broadly construed to mean anything that allows the wearable neutron detector 500 to be attached to the human body unless otherwise specifically claimed.

As illustrated, the wearable neutron detector 500 includes a first strap 506 and a second strap 508 that are used to secure the wearable neutron detector 500 to a forearm of a user. A central portion 510 is positioned between the straps 506, 508 and runs along the arm of the user. In one form, the central portion 510 contains the electrical components of the wearable neutron detector 500. An enunciator 512 is located on the second strap 512 for generating alerts that may be enunciated to the user of the wearable neutron detector 500 detects an increase in neutron detection.

Figure 6:
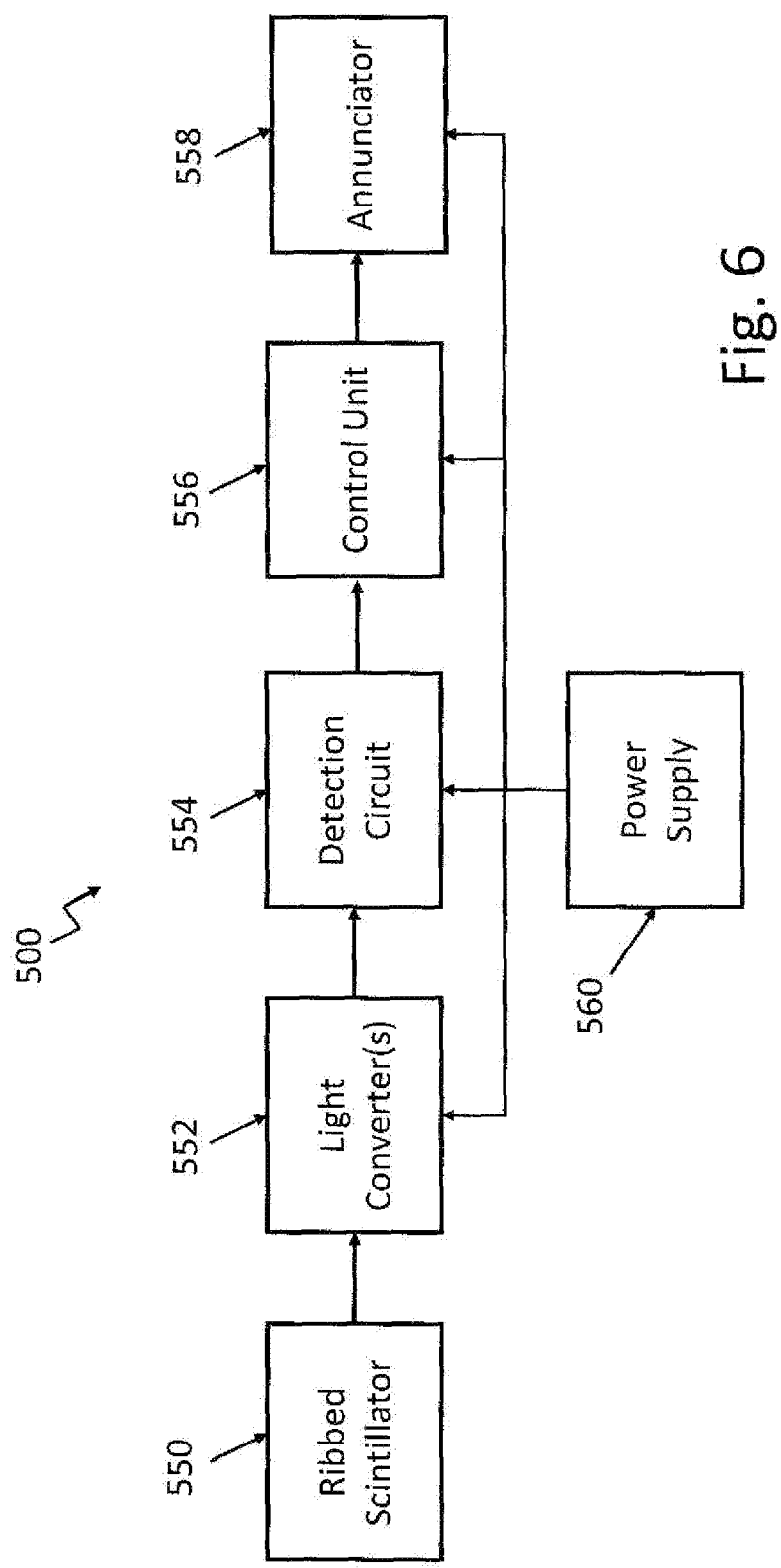
FIG. 6 is a block diagram illustrating components of the wearable neutron detector.

Referring to FIG. 6, the wearable neutron detector 500 includes a ribbed scintillator 550 that is connected with one or more light converters 552. The output of the one or more light converters 552 is connected with a detection circuit 554. The output of the detection circuit 554 is connected with a control unit 556. The control unit 556 is connected with an annunciator 558. A power supply 560 is connected with the light converters 552, the detection circuit 554, the control unit 556, and the annunciator 558. In one form, the power supply 560 is operable to generate a high voltage output that is supplied to the light converters 552.

As previously set forth, in one form, the light converters 552 can comprise charge-coupled devices (CCDs). In another form, the light converters 552 can comprise photomultiplier tubes (PMTs). In yet another form, the light converters 552 can comprise any type of electro-optical sensor that is capable of detecting light emitted from the wave length shifting optical fibers. The detection circuit 554 can comprise a stereo detection circuit such as that disclosed in commonly owned U.S. Pat. No. 9,116,247, which is hereby incorporated by reference in its entirety as if fully set forth herein.

The detection circuit 554 is operable to generate an output that is indicative of the detection of a neutron event (e.g.,—the detection of a threshold level of neutrons). The control unit 556 is connected with the output of the detection circuit 554 and is operable to receive signals from the detection circuit 554. Once a neutron event is detected, the control unit 556 is configured and operable to generate an output that is directed to the annunciator 558.

As illustrated in FIG. 6, the annunciator 558 is configured to generate an announcement of a neutron event. In one form, the annunciator 558 comprises a display, such as an LCD display, for example. In this form, the control unit 556 is operable to generate an output signal that is sent to the display causing the display to generate a graphical representation of the neutron event. In another form, the annunciator 558 comprises a speaker or buzzer. In this form, the control unit is configured to generate an output signal that causes the speaker to generate one or more audible alarms or alerts. In yet another form, the annunciator 558 can comprise a wireless transmitter. In this form, the control unit 556 is operable to cause the wireless transmitter to transmit a wireless signal that could be received by an external device, such as a smartphone, for example.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claim, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A wearable neutron detector, comprising:
   a body attachment portion that is configured to be secured to a portion of a human body;
   a scintillator having a plurality of wavelength optical shifting fibers;
   one or more light converters connected with said plurality of wavelength optical shifting fibers;
   a detection circuit connected with said one or more light converters configured to detect a neutron event;
   a control unit connected with said detection circuit;
   an annunciator connected with said control unit for generating an enunciation of said neutron event; and
   wherein said scintillator, said one or more light converters, said detection circuit, said control unit, and said enunciator are associated with said body attachment portion.

2. The wearable neutron detector of claim 1, wherein said scintillator comprises:
   a scintillator body comprising a radiation absorptive material, a scintillating material, and a binder;
   the scintillator body further formed with a multiplicity of protruding parallel ribs on a first side;
   a wavelength shifting fiber positioned between each adjacent pair of ribs, wherein the wavelength shifting fiber is in optical proximity to the adjacent pair of said ribs; and
   a second multiplicity of protruding parallel ribs formed on a second side of said scintillator body, a second wavelength shifting fiber positioned between each second adjacent pair of ribs, wherein the second wavelength shifting fiber is in optical proximity to the second adjacent pair of said ribs.

3. The wearable neutron detector of claim 1, wherein said scintillator further comprises:
   a multiplicity of protruding parallel ribs on a first side (first ribs) and a second multiplicity of protruding parallel ribs on a second side (second ribs); and
   a set of wavelength shifting optical fibers positioned between each adjacent pair of first ribs and each adjacent pair of second ribs.

4. The wearable neutron detector of claim 3, wherein said set of wavelength shifting optical fibers are connected with said one or more light converters.

5. The wearable neutron detector of claim 4, wherein said one or more light converters comprise one or more photomultiplier tubes.

6. The wearable neutron detector of claim 4, wherein said one or more light converters comprise one or more charge-coupled devices.

7. The wearable neutron detector of claim 1, wherein said detection circuit comprises a stereo detection circuit.

8. The wearable neutron detector of claim 1, wherein said annunciator comprises a speaker, wherein said control unit is operable to generate one or more audible alerts in response to said neutron event.

9. The wearable neutron detector of claim 1, wherein said annunciator comprises a display, wherein said control unit is operable to generate an alert on said display in response to said neutron event.

10. A wearable neutron detector, comprising:
    a body attachment portion that is configured to be secured to a portion of a human body;
    a scintillator having a multiplicity of protruding parallel ribs on a first side (first ribs) and a second multiplicity of protruding parallel ribs on a second side (second ribs) and a set of wavelength shifting optical fibers positioned between each adjacent pair of first ribs and each adjacent pair of second ribs;
    one or more light converters connected with said set of wavelength shifting optical fibers;
    a detection circuit connected with said one or more light converters configured to detect a neutron event;
    a control unit connected with an output of said detection circuit;
    an annunciator connected with said control unit for generating an announcement of said neutron event; and
    wherein said scintillator, said one or more light converters, said detection circuit, said control unit, and said annunciator are housed within said body attachment portion.

11. The wearable neutron detector of claim 10, wherein said annunciator comprises a speaker and said announcement comprises one or more audible alarms.

12. The wearable neutron detector of claim 10, wherein said annunciator comprises a display and said announcement comprises one or more graphical displays generated by said control unit on said display.

13. The wearable neutron detector of claim 10, wherein said body attachment portion comprises a first strap configured to be placed on an arm of a user, a second strap configured to be placed on said arm of said user, and a central portion between said first and second straps, wherein said enunciator is positioned in said second strap and said scintillator is positioned in said central portion.

14. The wearable neutron detector of claim 10, wherein the first ribs are parallel to, and offset from, the second ribs.

15. A neutron detector wearable on a human body, comprising:
    a body attachment portion that is configured to be secured to a portion of said human body;
    a scintillator having a multiplicity of protruding parallel ribs on a firs side (first ribs) and a second multiplicity of protruding parallel ribs on a second side (second ribs) and a set of wavelength shifting optical fibers positioned between each adjacent pair of first ribs and each adjacent pair of second ribs;
    at least two light converters connected with said set of wavelength shifting optical fibers such that a first wavelength optical fiber from said set of wavelength optical fibers is connected with a first light converter and a second wavelength optical fiber from said set of wavelength optical fibers is connected with a second light converter;
    a detection circuit connected with said one or more light converters configured to detect a neutron event;
    a control unit connected with an output of said detection circuit;
    an annunciator connected with said control unit for generating an announcement of said neutron event; and
    wherein said scintillator, said one or more light converters, said detection circuit, said control unit, and said annunciator are all housed within said body attachment portion.

16. The neutron detector wearable on a human body of claim 15, wherein said portion of said human body comprises a forearm.

17. The neutron detector wearable on a human body of claim 15, wherein said annunciator comprises a speaker.

18. The neutron detector wearable on a human body of claim 15, wherein said annunciator comprises a display.

19. The neutron detector wearable on a human body of claim 15, wherein said annunciator comprises a wireless transmitter.

20. The neutron detector wearable on a human body of claim 15, wherein said first ribs are parallel to, and offset from, said second ribs.

* * * * *